United States Patent
Sonobe et al.

(10) Patent No.: US 11,005,373 B2
(45) Date of Patent: May 11, 2021

(54) SWITCHING POWER SUPPLY CONTROL CIRCUIT WITH BOTTOM POINT DETECTION

(71) Applicants: FUJI ELECTRIC CO., LTD., Kawasaki (JP); MEAN WELL ENTERPRISES CO., LTD., New Taipei (TW)

(72) Inventors: Koji Sonobe, Matsumoto (JP); Yu-Wei Chung, New Taipei (TW)

(73) Assignees: FUJI ELECTRIC CO., LTD., Kawasaki (JP); MEAN WELL ENTERPRISES CO., LTD., New Taipei (TW)

( * ) Notice: Subject to any disclaimer, the term of this patent is extended or adjusted under 35 U.S.C. 154(b) by 0 days.

(21) Appl. No.: 16/175,193

(22) Filed: Oct. 30, 2018

(65) Prior Publication Data
US 2019/0068064 A1 Feb. 28, 2019

Related U.S. Application Data

(63) Continuation of application No. PCT/JP2016/065718, filed on May 27, 2016.

(51) Int. Cl.
*H02M 3/335* (2006.01)
*H02M 1/42* (2007.01)
(Continued)

(52) U.S. Cl.
CPC ......... *H02M 3/33507* (2013.01); *H02M 1/08* (2013.01); *H02M 1/4225* (2013.01); *H02M 1/4258* (2013.01); *H02M 2001/0022* (2013.01)

(58) Field of Classification Search
CPC .............. H02M 3/33507; H02M 1/08; H02M 1/14225; H02M 1/14258; H02M 2001/0022
See application file for complete search history.

(56) References Cited

U.S. PATENT DOCUMENTS

2005/0078494 A1   4/2005  Aihara et al.
2011/0025278 A1*  2/2011  Balakrishnan .......... H02M 1/32
                                                  320/166
(Continued)

FOREIGN PATENT DOCUMENTS

CN     101989810 A      3/2011
CN     106655751 A  *   5/2017
(Continued)

OTHER PUBLICATIONS

FUJI Power Supply Control IC FA5590/FA5591 Application Note, Fuji Electric Co., Ltd., Apr. 2011 (Year: 2011).*
(Continued)

*Primary Examiner* — Kyle J Moody
*Assistant Examiner* — Jye-June Lee

(57) ABSTRACT

A switching power supply apparatus includes a switching device and a switching power supply control circuit for converting an AC source voltage to a DC voltage. A comparison circuit in the switching power supply control circuit produces an H-level output signal when its non-inverted input voltage exceeds a voltage value during each off-state period of the switching device. A delay circuit outputs a pulse signal after a predetermined delay time from detecting the H-level signal. This pulse signal indicates detection of a bottom point of drain voltage of the switching device. Since the output of the delay circuit is directly connected to the set input terminal S of a flip-flop, the switching device is surely turned on, without bottom skip, upon detection of the bottom point of its drain voltage.

8 Claims, 9 Drawing Sheets

(51) Int. Cl.
  *H02M 1/08* (2006.01)
  *H02M 1/00* (2006.01)

(56) References Cited

U.S. PATENT DOCUMENTS

| | | |
|---|---|---|
| 2012/0105018 A1 | 5/2012 | Balakrishnan et al. |
| 2013/0307497 A1* | 11/2013 | Chen .................. H02M 3/1563 |
| | | 323/235 |
| 2013/0308359 A1* | 11/2013 | Chen .................... H02M 7/217 |
| | | 363/89 |
| 2014/0097803 A1 | 4/2014 | Balakrishnan et al. |
| 2014/0185334 A1 | 7/2014 | Chen |
| 2015/0137784 A1 | 5/2015 | Sugawara |
| 2015/0256059 A1 | 9/2015 | Balakrishnan et al. |
| 2017/0302156 A1 | 10/2017 | Balakrishnan et al. |
| 2019/0074762 A1 | 3/2019 | Balakrishnan et al. |

FOREIGN PATENT DOCUMENTS

| | | |
|---|---|---|
| JP | 2000197347 A | 7/2000 |
| JP | 2000287442 A | 10/2000 |
| JP | 2003125585 A | 4/2003 |
| JP | 2007244121 A | 9/2007 |
| JP | 2014131455 A | 7/2014 |
| JP | 201519558 A | 1/2015 |
| JP | 2015104170 A | 6/2015 |

OTHER PUBLICATIONS

International Search Report dated Aug. 9, 2016 in corresponding International Patent Application No. PCT/JP/2016/065718.
Chinese Office Action dated Nov. 29, 2019 in corresponding Chinese Patent Application No. 201680084862.4.

* cited by examiner

SWITCHING POWER SUPPLY CONTROL CIRCUIT WITH BOTTOM POINT DETECTION

CROSS-REFERENCE TO RELATED APPLICATIONS

This application is a continuation application of International Application PCT/JP2016/065718 filed on May 27, 2016 which designated the U.S., the entire contents of which are incorporated herein by reference.

BACKGROUND

1. Field

The embodiment discussed herein is related to a switching power supply control circuit and a switching power supply apparatus.

2. Related Art

Some switching power supply apparatuses which convert an AC source voltage to a DC voltage include switching power supply control circuits which perform power factor correction for reducing harmonics (see, for example, Japanese Laid-open Patent Publication No. 2014-131455).

A switching power supply control circuit makes a power factor approach one by making the phase of the waveform of an input current of a switching power supply apparatus equal to that of the waveform of an AC input voltage rectified by a rectifying circuit, and is also referred to as a power factor correction circuit.

Furthermore, some conventional switching power supply control circuits have the function of checking an increase in switching frequency at light load time.

With conventional switching power supply control circuits, however, the waveform of an input current deviates from a sine wave when the function of checking an increase in switching frequency becomes effective. As a result, a power factor becomes lower and harmonics may increase.

SUMMARY

According to an aspect, there is provided a switching power supply control circuit in a switching power supply apparatus including a first converter that converts an input AC source voltage to a first DC voltage while performing power factor correction and a second converter that converts the first DC voltage to a second DC voltage. The switching power supply control circuit includes a bottom detection circuit that detects a bottom point of a voltage across terminals of a switching device included in the first converter; and a control signal generation circuit that generates a control signal for the switching device upon receipt from the bottom detection circuit of an output signal indicating the detected bottom point, the generated control signal surely causing the switching device to turn on.

Additional aspects and/or advantages will be set forth in part in the description which follows and, in part, will be apparent from the description, or may be learned by practice of the claimed invention.

It is to be understood that both the foregoing general description and the following description of embodiments provide illustrative examples and explanations and are not restrictive of the claimed invention.

DESCRIPTION OF EMBODIMENTS

An embodiment will now be described with reference to the drawings.

Figure 1:
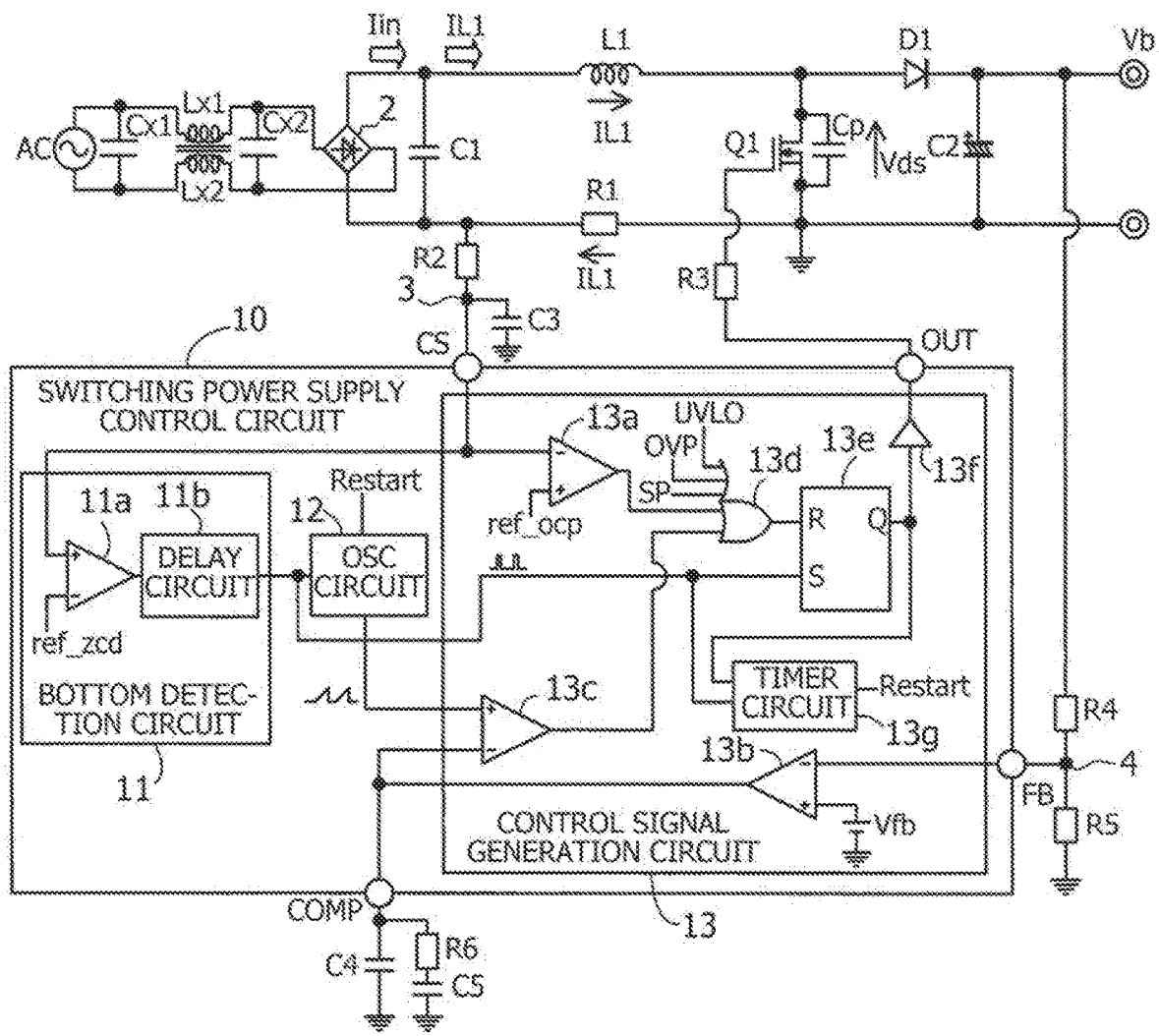
FIG. 1 illustrates an example of a switching power supply apparatus according to an embodiment.

FIG. 1 illustrates an example of a switching power supply apparatus according to an embodiment.

A switching power supply apparatus 1 according to an embodiment is applied, for example, to power supplies (such as power supplies for light emitting diode (LED) lighting) in fields in which severe restrictions are imposed on harmonics.

FIG. 1 illustrates a power factor control (PFC) step-up converter which is a front stage part of the two-converter type switching power supply apparatus 1. A direct current (DC)-DC converter which is a back stage part of the two-converter type switching power supply apparatus 1 is not illustrated.

The switching power supply apparatus 1 includes an input filter including inductors Lx1 and Lx2 and capacitors Cx1 and Cx2, a full-wave rectifier 2, capacitors C1, C2, C3, C4, and C5, an inductor L1, resistors R1, R2, R3, R4, R5, and R6, a diode D1, a switching device Q1, and a switching power supply control circuit 10.

The full-wave rectifier 2 full-wave-rectifies an AC input voltage supplied from an AC source AC. The input filter has the function of making a current supplied from the AC source AC not a sawtooth current like that flowing through the inductor L1 as a result of switching operation, but a continuous current.

The capacitor C1 removes high-frequency components generated due to switching operation. One end of the capacitor C1 is connected to the full-wave rectifier 2 and one end of the inductor L1. The other end of the capacitor C1 is grounded via the resistor R1.

The one end of the inductor L1 is connected to the one end of the capacitor C1 and the other end of the inductor L1 is connected to the switching device Q1 and an anode of the diode D1.

The inductor L1, the diode D1, the switching device Q1, and the capacitor C2 function as a step-up circuit.

The anode of the diode D1 is connected to the inductor L1 and the switching device Q1 and a cathode of the diode D1 is connected to one end of the capacitor C2 and the resistor R4.

As illustrated in FIG. 1, the switching device Q1 is, for example, an n-channel metal-oxide semiconductor field effect transistor (MOSFET). A drain of the switching device Q1 is connected to the inductor L1 and the anode of the diode D1. A gate of the switching device Q1 is connected to a terminal OUT of the switching power supply control circuit 10 via the resistor R3. A source of the switching device Q1 and the other end of the capacitor C2 are grounded and are connected to a terminal CS of the switching power supply control circuit 10 via the resistors R1 and R2. Furthermore, a capacitor Cp indicates a parasitic capacitor between the source and drain of the switching device Q1.

A voltage across terminals of the capacitor C2 is an output voltage Vb and is supplied to the DC-DC converter (not illustrated).

One end of the capacitor C3 is connected to a node 3 between the resistor R2 and the terminal CS. The other end of the capacitor C3 is grounded.

The resistors R4 and R5 are connected in series. A node 4 between the resistors R4 and R5 is connected to a terminal FB of the switching power supply control circuit 10. The output voltage Vb is divided by the resistors R4 and R5 and is supplied to the switching power supply control circuit 10.

The capacitors C4 and C5 and the resistor R6 function as a phase compensation circuit. One end of the capacitor C4 is connected to a terminal COMP of the switching power supply control circuit 10. One end of the capacitor C5 is connected to the terminal COMP via the resistor R6. The other ends of the capacitors C4 and C5 are grounded.

The switching power supply control circuit 10 is realized, for example, by a one-package integrated circuit (IC). The switching power supply control circuit 10 includes a bottom detection circuit 11, an oscillation circuit 12, and a control signal generation circuit 13. The switching power supply control circuit 10 is a control circuit of the PFC step-up converter which is the front stage part of the two-converter type switching power supply apparatus 1. However, a control circuit of the DC-DC converter which is the back stage part of the two-converter type switching power supply apparatus 1 is also realized in the same way by an IC and is mounted in the same package (not illustrated). By mounting these ICs together in a single package, a control apparatus of the two-converter type switching power supply apparatus 1 which is easy to handle is realized.

Figure 2:
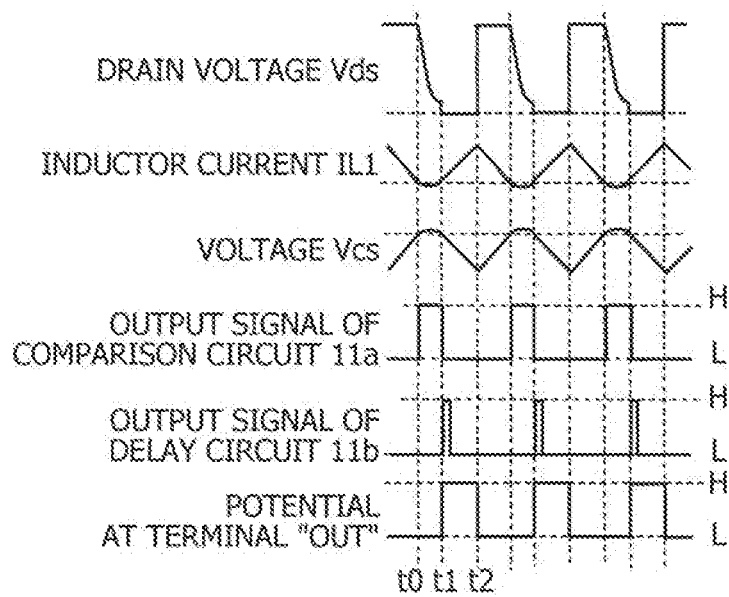
FIG. 2 is a timing chart which indicates an example of the operation of the switching power supply apparatus according to the embodiment.

The bottom detection circuit 11 includes a comparison circuit 11a and a delay circuit 11b. The comparison circuit 11a compares a voltage value obtained by converting an inductor current IL1 passing through the inductor L1 to a voltage by the resistor R1 with a voltage value ref_zcd and detects a time point at which the inductor current IL1 becomes zero. The absolute value of the voltage value ref_zcd is made as small as possible. FIG. 2 described later indicates waveforms obtained in a case where the voltage value ref_zcd is zero.

When the switching device Q1 turns on, the inductor current IL1 increases and energy is stored in the inductor L1. When the switching device Q1 turns off, the diode D1 goes into a conducting state, the energy stored in the inductor L1 is released to the output side, and the inductor current IL1 decreases. A drain voltage Vds of the switching device Q1 during a period during which the diode D1 is in a conducting state is equal to (voltage across the terminals of the capacitor C2)+(forward voltage of the diode D1). When the inductor current IL1 becomes zero (energy stored in the inductor L1 becomes zero), the diode D1 goes into a non-conducting state, the resonance operation of a resonance circuit including the inductor L1 and the parasitic capacitor Cp begins, and the drain voltage Vds decreases. Because the capacitance value of the parasitic capacitor Cp is small, the inductor current IL1 is small at resonant operation time.

A period from the time when the resonant operation begins to the time when the drain voltage Vds decreases to a minimum is estimated in advance and is set in the delay circuit 11b as delay time. When the set delay time elapses after the comparison circuit 11a detects that the inductor current IL1 passing through the inductor L1 is zero, the delay circuit 11b generates a pulse signal. This pulse signal indicates that a bottom point (minimum state) of the drain voltage Vds is detected. In the example of FIG. 1, a non-inverting input terminal of the comparison circuit 11a is connected to the terminal CS. The voltage value ref_zcd is applied to an inverting input terminal of the comparison circuit 11a. For example, the voltage value ref_zcd is generated by a voltage value generation circuit (not illustrated) in the switching power supply control circuit 10 by the use of a source voltage supplied from the outside of the switching power supply control circuit 10. Voltage values ref_ocp and Vfb described later are also generated by the voltage value generation circuit (not illustrated).

A voltage value inputted to the terminal CS is a negative value whose absolute value becomes greater with an increase in the inductor current IL1 and whose absolute value approaches zero with a decrease in the inductor current IL1. In the example of FIG. 1, when a voltage value applied to the non-inverting input terminal exceeds the voltage value ref_zcd, the comparison circuit 11a outputs a high(H)-level output signal which indicates that a bottom point of the drain voltage Vds is detected.

The oscillation circuit 12 is connected to an output terminal of the delay circuit 11b and outputs an oscillating signal (ramp signal). When the oscillation circuit 12 receives from the delay circuit 11b an output signal which indicates that a bottom point of the drain voltage Vds is detected, the potential of the oscillating signal rises. The oscillating signal returns to zero at a time point at which a flip-flop 13e is reset by connections (not illustrated).

A signal Restart is supplied to the oscillation circuit 12 from a timer circuit 13g described later. When the signal Restart is activated (its potential becomes an H level, for example), the potential of the oscillating signal is raised regardless of another input signal.

The control signal generation circuit 13 outputs a control signal (gate signal), which causes the switching device Q1 to turn on, at a time point at which the potential of an oscillating signal outputted from the oscillation circuit 12 rises.

The control signal generation circuit 13 includes a comparison circuit 13a, an error amplifier 13b, a comparison circuit 13c, an OR circuit 13d, the flip-flop 13e, a buffer circuit 13f, and the timer circuit 13g.

The comparison circuit 13a is used for overcurrent protection (OCP). An inverting input terminal of the comparison circuit 13a is connected to the terminal CS. A voltage value ref_ocp for detecting an overcurrent is applied to a non-inverting input terminal of the comparison circuit 13a. When a voltage value applied to the terminal CS falls below the voltage value ref_ocp, the comparison circuit 13a outputs an H-level signal indicative of the generation of an overcurrent in order to turn off the switching device Q1.

The error amplifier 13b amplifies and outputs the difference between a voltage value applied to the terminal FB and the voltage value Vfb which is reference for determining an output voltage. An inverting input terminal of the error amplifier 13b is connected to the terminal FB and the voltage value Vfb is applied to a non-inverting input terminal of the error amplifier 13b.

The comparison circuit 13c is used for performing pulse width modulation (PWM). An inverting input terminal of the comparison circuit 13c is connected to a terminal COMP and an output terminal of the error amplifier 13b. An oscillating signal outputted from the oscillation circuit 12 is supplied to a non-inverting input terminal of the comparison circuit 13c. When a voltage value applied to the non-inverting input terminal is smaller than a voltage value applied to the inverting input terminal, the comparison circuit 13c outputs a low(L)-level signal. When a voltage value applied to the non-inverting input terminal exceeds a voltage value applied to the inverting input terminal, the comparison circuit 13c outputs an H-level signal in order to turn off the switching device Q1.

The OR circuit 13d receives output signals from the comparison circuits 13a and 13c and signals SP, OVP, and UVLO. When one of these signals is at an H level, the OR circuit 13d outputs an H-level output signal in order to turn off the switching device Q1.

The signal SP becomes an H level when a short circuit is detected on the basis of the result of a comparison by a comparison circuit (not illustrated) between a voltage value at the terminal FB and a determined voltage value.

The signal OVP becomes an H level when an overvoltage is detected on the basis of the result of a comparison by a comparison circuit (not illustrated) between a voltage value at the terminal FB and a determined voltage value.

The signal UVLO becomes an H level when a low voltage state of the switching power supply control circuit 10 is detected on the basis of the result of a comparison by a comparison circuit (not illustrated) between the source voltage of the switching power supply control circuit 10 and a determined voltage value.

The flip-flop 13e has a reset input terminal R, a set input terminal S, and an output terminal Q. An output terminal of the OR circuit 13d is connected to the reset input terminal R. A pulse signal outputted from the delay circuit 11b is supplied to the set input terminal S. The output terminal Q is connected to the terminal OUT via the buffer circuit 13f. When potential at the set input terminal S is at an H level and potential at the reset input terminal R is at an L level, the flip-flop 13e is set and outputs an H-level output signal from the output terminal Q. Furthermore, the flip-flop 13e is a reset dominant flip-flop. When potential at the reset input terminal R is at an H level, the flip-flop 13e outputs an L-level output signal from the output terminal Q regardless of the level of potential at the set input terminal S.

The timer circuit 13g monitors potential at the set input terminal S of the flip-flop 13e. If potential at the set input terminal S does not become an H level for a determined period, then the timer circuit 13g makes the signal Restart an H level. In addition, when potential at the output terminal Q of the flip-flop 13e becomes an H level, the timer circuit 13g resets a timer value.

With the above switching power supply apparatus 1 the comparison circuit 11a detects a time point at which the inductor current IL1 passing through the inductor L1 becomes zero. After that, the delay circuit 11b creates a delay of determined time. By doing so, a bottom point of the drain voltage Vds is detected and the switching device Q1 is turned on. That is to say, critical conduction mode PFC control is exercised.

An example of the operation of the switching power supply apparatus 1 according to the embodiment which exercises current-critical PFC control will now be described.

FIG. 2 is a timing chart which indicates an example of the operation of the switching power supply apparatus according to the embodiment. FIG. 2 indicates the states of the drain voltage Vds of the switching device Q1, the inductor current IL1 passing through the inductor L1, a voltage Vcs at the terminal CS, an output signal of the comparison circuit 11a, an output signal of the delay circuit 11b, and potential at the terminal OUT.

When a voltage value applied to the non-inverting input terminal of the comparison circuit 11a exceeds the voltage value ref_zcd at the time of the switching device Q1 being in an off state, an output signal of the comparison circuit 11a becomes an H level (time t0). When determined delay time elapses after the delay circuit 11b detects rising to the H level (time t1), the delay circuit 11b outputs a pulse signal. As a result, the potential of an oscillating signal outputted from the oscillation circuit 12 rises at a determined slope and potential at the terminal OUT is at an H level for a determined period. Accordingly, the switching device Q1 is in an on state for the determined period and the drain voltage Vds of the switching device Q1 is approximately 0 V. Energy is stored in the inductor L1 for this period.

When potential at the terminal OUT becomes an L level (time t2) and the switching device Q1 turns off, the drain voltage Vds rises. As stated above, the release of the energy stored in the inductor L1 to the output side via the diode D1 is then begun. When the energy stored in the inductor L1 becomes zero, time t0 of the next cycle comes. After that, the same operation is repeated.

The relationship between an input current Iin and the inductor current IL1 passing through the inductor L1 is as follows.

Figure 3A:
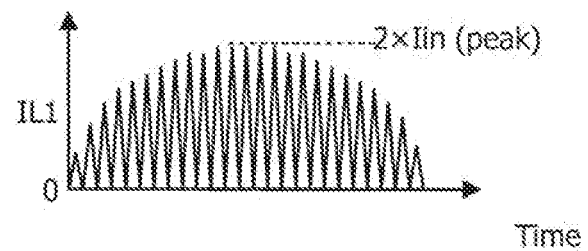
FIGS. 3A and 3B indicate an example of the relationship between an input current and an inductor current.
Figure 3B:
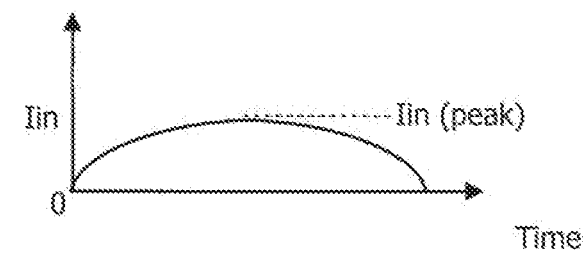

FIGS. 3A and 3B indicate an example of the relationship between an input current and the inductor current. In FIGS. 3A and 3B, each horizontal axis indicates time and a vertical axis indicates the magnitude of the inductor current IL1 (FIG. 3A) or an input current Iin (FIG. 3B).

As indicated by the graph of FIG. 3A, the waveform of the inductor current IL1 becomes a triangular wave due to the switching operation of the switching device Q1.

Time from the bottom to the peak of a triangular wave and time from the peak to the bottom of the triangular wave change according to the on-width and off-width of the switching device Q1. If the on-width is constant, then time from the bottom to the peak of a triangular wave is constant. Because a value obtained by differentiating the inductor current IL1 at this time is proportional to an AC input voltage, the peak of the inductor current IL1 is proportional to the AC input voltage whose waveform is a sine wave. When the absolute value of the AC input voltage is small (absolute value of the peak of the inductor current IL1 is small), the peak of the inductor current IL1 is small and voltage across the inductor L1 (output voltage Vb-AC input voltage) is large. Therefore, the off-width is small and time from the peak to the bottom of a triangular wave is short.

By averaging the inductor current IL1 indicated in FIGS. 3A and 3B with the input filter including the inductors Lx1 and Lx2 and the capacitors Cx1 and Cx2, the waveform of the input current Iin becomes a sine wave. Twice the peak of the input current Iin (Iin(peak)) is the peak of the inductor current IL1.

As has been described, the switching power supply control circuit 10 makes the waveform of the input current Iin a sine wave. By doing so, power factor correction is performed and harmonics are reduced.

Switching power supply control circuits having the function of checking an increase in switching frequency at light load time will now be described as comparative examples. There is a maximum frequency limitation function or a bottom skip function as the function of checking an increase in switching frequency.

Comparative Example 1

Figure 4:
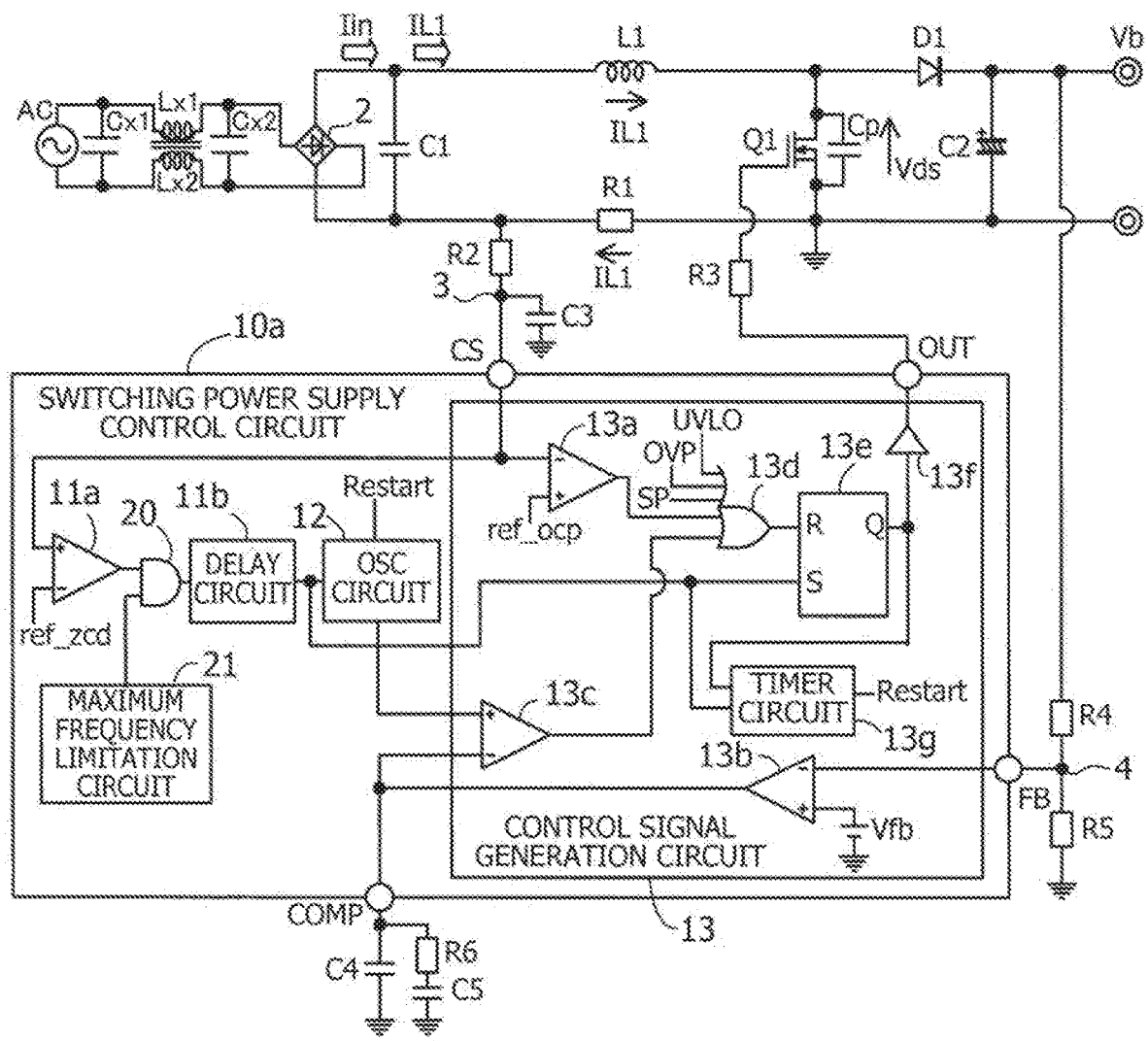
FIG. 4 illustrates an example of a switching power supply control circuit and switching power supply apparatus having a maximum frequency limitation function.

FIG. 4 illustrates an example of a switching power supply control circuit and switching power supply apparatus having a maximum frequency limitation function. Components in FIG. 4 which are the same as those included in the switching power supply apparatus 1 illustrated in FIG. 1 are marked with the same numerals.

A switching power supply control circuit 10a of a switching power supply apparatus 1a includes an AND circuit 20 and a maximum frequency limitation circuit 21.

One input terminal of the AND circuit 20 is connected to an output terminal of a comparison circuit 11a and an output signal of the maximum frequency limitation circuit 21 is inputted to the other input terminal of the AND circuit 20. An oscillation circuit 12 is connected to an output terminal of the AND circuit 20 via a delay circuit 11b.

Until time determined from a cycle corresponding to a preset maximum frequency elapses after a switching device Q1 turns on the last time, the maximum frequency limitation circuit 21 outputs an L-level signal.

With the above switching power supply control circuit 10a, even if the comparison circuit 11a detects that an inductor current IL1 is zero, a pulse signal is not outputted from the delay circuit 11b while an output signal of the maximum frequency limitation circuit 21 is at an L level. As a result, the potential of an oscillating signal outputted from the oscillation circuit 12 does not rise. This prohibits switching operation at a frequency higher than the maximum frequency.

Figure 5:
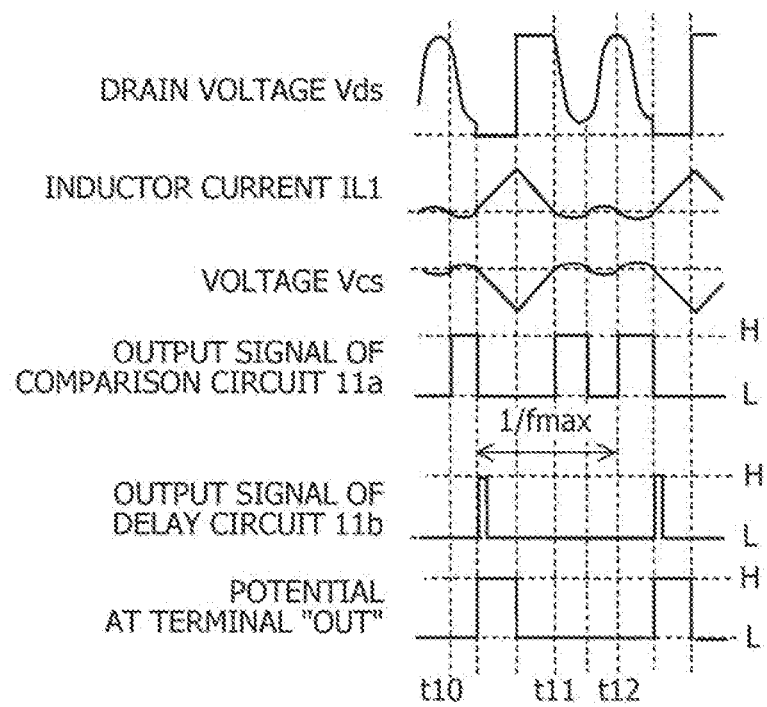
FIG. 5 is a timing chart which indicates an example of the operation of the switching power supply apparatus according to comparative example 1.

FIG. 5 is a timing chart which indicates an example of the operation of the switching power supply apparatus according to comparative example 1. FIG. 5 indicates the states of a drain voltage Vds of the switching device Q1, the inductor current IL1 passing through an inductor L1, a voltage Vcs at a terminal CS, an output signal of the comparison circuit 11a, an output signal of the delay circuit 11b, and potential at a terminal OUT.

When the inductor current IL1 changes at the time of the switching device Q1 being in an off state and the comparison circuit 11a detects that the inductor current IL1 has become zero, an output signal of the comparison circuit 11a becomes an H level (time t10, t11, and t12). However, if a period which elapses until the inductor current IL1 becomes zero again is shorter than the reciprocal (1/fmax) of the maximum frequency fmax set in the maximum frequency limitation circuit 21, an output signal of the AND circuit 20 is at an L level. For example, this period is (t11-t10) at the time t11 and is shorter than the reciprocal (1/fmax) of the maximum frequency fmax set in the maximum frequency limitation circuit 21. Accordingly, the delay circuit 11b does not output a pulse signal. As a result, the potential of an oscillating signal does not rise and potential at the terminal OUT remains at an L level. That is to say, if a switching frequency is higher than the maximum frequency fmax, then switching operation is stopped.

The switching power supply control circuit 10a according to comparative example 1 checks in this way an increase in switching frequency.

Comparative Example 2

Figure 6:
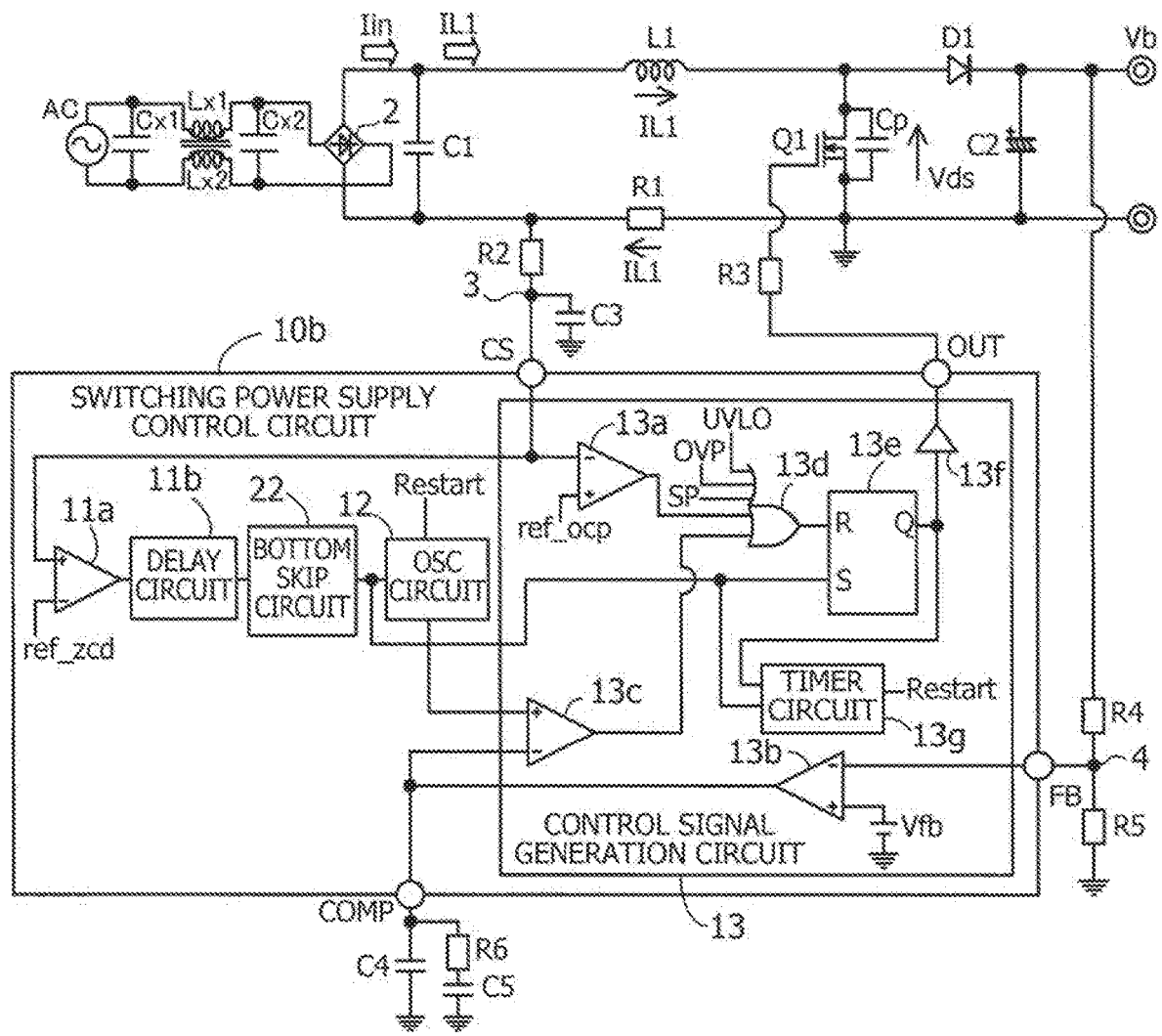
FIG. 6 illustrates an example of a switching power supply control circuit and switching power supply apparatus having a bottom skip function.

FIG. 6 illustrates an example of a switching power supply control circuit and switching power supply apparatus having a bottom skip function. Components in FIG. 6 which are the same as those included in the switching power supply apparatus 1 illustrated in FIG. 1 are marked with the same numerals.

A switching power supply control circuit 10b of a switching power supply apparatus 1b includes a bottom skip circuit 22 between an output terminal of a delay circuit 11b and an oscillation circuit 12.

Even when the delay circuit 11b detects a bottom point of a drain voltage Vds, the bottom skip circuit 22 outputs an L-level signal if a prescribed bottom skip number corresponding to a load is not satisfied. Accordingly, the potential of an oscillating signal outputted from the oscillation circuit 12 does not rise. As a result, switching operation is stopped. If the prescribed bottom skip number is satisfied, then the bottom skip circuit 22 passes an output pulse of the delay circuit 11b in its original condition.

Figure 7:
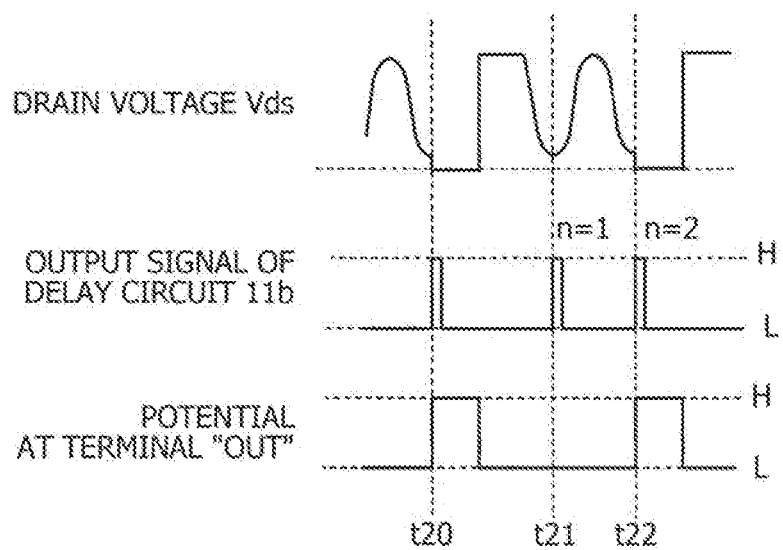
FIG. 7 is a timing chart which indicates an example of the operation of the switching power supply apparatus according to comparative example 2.

FIG. 7 is a timing chart which indicates an example of the operation of the switching power supply apparatus according to comparative example 2. FIG. 7 indicates the states of a drain voltage Vds of a switching device Q1, an output signal of the delay circuit 11b, and potential at a terminal OUT. In the example of FIG. 7, a bottom skip number n is set to 2. The bottom skip number is determined on the basis of an output signal of an error amplifier 13b.

When an inductor current IL1 changes at the time of the switching device Q1 being in an off state and a comparison circuit 11a detects that the inductor current IL1 has become zero, an output signal of the comparison circuit 11a becomes an H level. When determined delay time elapses after the delay circuit 11b detects this H level, the delay circuit 11b outputs a pulse signal (time t20, t21, and t22). At the time t21, however, a bottom detection number does not reach the bottom skip number. As a result, a flip-flop 13e is not set and potential at the terminal OUT remains at an L level. That is to say, if a bottom detection number does not reach n=2, then switching operation is stopped.

The switching power supply control circuit 10b according to comparative example 2 checks in this way an increase in switching frequency.

However, if the above switching power supply control circuits 10a and 10b according to the two comparative examples check an increase in switching frequency, a power factor may decrease. The reason for this will now be described.

If an increase in switching frequency is checked by a bottom skip or the like when the on-width of the switching device Q1 is constant, the absolute value of an AC input voltage is small, and the peak of the inductor current IL1 is low, the inductor current IL1 per cycle is small and the input current Iin is also small. As a result, the waveform of the input current Iin deviates from a sine wave.

Figure 8:
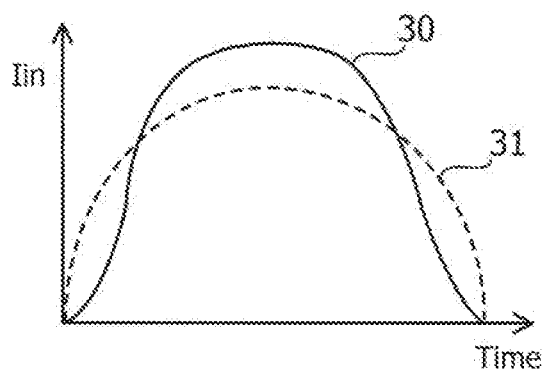
FIG. 8 indicates an example of the waveforms of input currents in the switching power supply apparatus according to the comparative examples.

FIG. 8 indicates an example of the waveforms of the input currents in the switching power supply apparatus according to the comparative examples.

A waveform 30 in FIG. 8 is the waveform corresponding to half of a cycle of the input current Iin in the switching power supply apparatus 1a or 1b. Furthermore, a waveform 31 is a sine wave corresponding to half of a cycle. As indicated in FIG. 8, the waveform 30 deviates from the sine wave. Accordingly, a power factor decreases. Furthermore, because the waveform 30 is distorted, harmonics increase.

With the switching power supply apparatus 1 illustrated in FIG. 1, on the other hand, the output terminal of the delay circuit 11b and the oscillation circuit 12 are directly connected. Therefore, when the delay circuit 11b generates a pulse signal, that is to say, when the bottom detection circuit 11 outputs an output signal indicative of the detection of the above bottom point, the switching device Q1 is surely turned on. That is to say, each time the drain voltage Vds falls to a bottom point, the switching device Q1 is always turned on without a bottom skip. This checks deviation of the waveform of the input current Iin from a sine wave.

A waveform 15 corresponding to half of a cycle of the input current Iin is indicated on the upper side of FIG. 1. In addition, a waveform 16 corresponding to half of a cycle of the input current Iin in the switching power supply apparatus 1a and 1b according to the comparative examples is indicated. The waveform 15 is a sine wave. Accordingly, a power factor in the switching power supply apparatus 1 is higher than a power factor in the switching power supply apparatus 1a or 1b. As a result, harmonics are reduced.

An example of the application of the above switching power supply control circuit 10 to a two-converter type switching power supply apparatus including a quasi-resonance DC-DC converter will now be described.

(Example of Two-Converter Type Switching Power Supply Apparatus)

Figure 9:
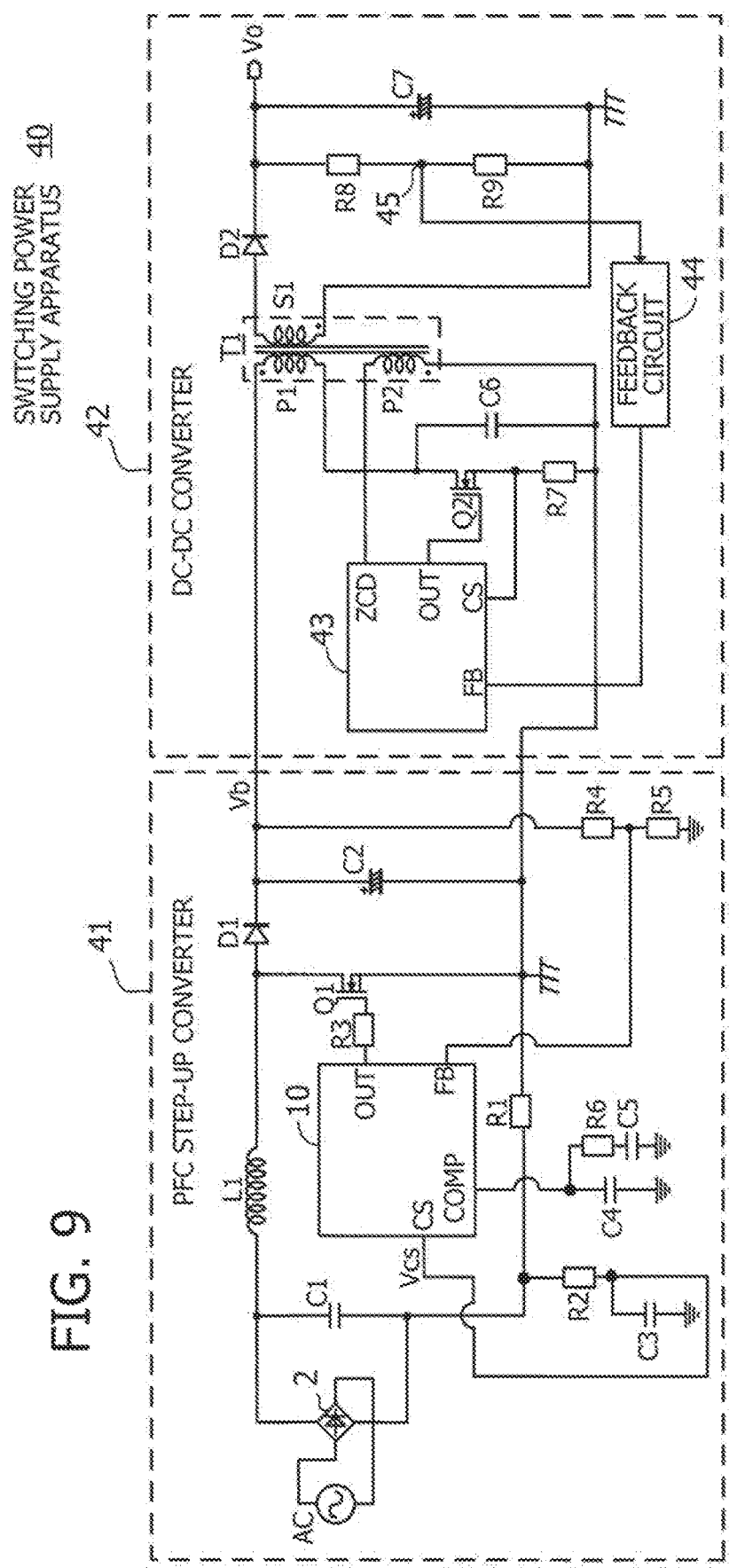
FIG. 9 illustrates an example of a two-converter type switching power supply apparatus.

FIG. 9 illustrates an example of a two-converter type switching power supply apparatus. Components in FIG. 9 which are the same as those included in the switching power supply apparatus 1 illustrated in FIG. 1 are marked with the same numerals.

A switching power supply apparatus 40 includes a PFC step-up converter 41 and a quasi-resonance DC-DC converter 42.

The PFC step-up converter 41 includes each component illustrated in FIG. 1 and supplies to the DC-DC converter 42 an output voltage Vb generated by the above operation.

The DC-DC converter 42 includes an insulating transformer T1, a switching device Q2, capacitors C6 and C7, resistors R7, R8, and R9, a diode D2, a switching power supply control circuit 43, and a feedback circuit 44.

The output voltage Vb outputted from the PFC step-up converter 41 is applied to a primary winding P1 of the insulating transformer T1. One end of an auxiliary winding P2 of the insulating transformer T1 is connected to a terminal ZCD of the switching power supply control circuit 43 and the other end of the auxiliary winding P2 is grounded. One end of a secondary winding S1 of the insulating transformer T1 is connected to an anode of the diode D2 and the other end of the secondary winding S1 is grounded.

As illustrated in FIG. 9, the switching device Q2 is, for example, an n-channel MOSFET. A drain of the switching device Q2 is connected to one end of the primary winding P1 and one end of the capacitor C6. The other end of the capacitor C6 is grounded. A source of the switching device Q2 is connected to a terminal CS of the switching power supply control circuit 43 and is grounded via the resistor R7. A gate of the switching device Q2 is connected to a terminal OUT of the switching power supply control circuit 43. The resistor R7 is a shunt resistor (current detection resistor) for detecting a current passing through the switching device Q2.

A cathode of the diode D2 is connected to the resistor R8 and one end of the capacitor C7.

A voltage across the capacitor C7 is outputted from the switching power supply apparatus 40 as an output voltage Vo and is supplied to a load (not illustrated).

The resistors R8 and R9 are connected in series. A node 45 between the resistors R8 and R9 is connected to a terminal FB of the switching power supply control circuit 43 via the feedback circuit 44.

The feedback circuit 44 amplifies the difference between a voltage obtained by dividing the output voltage Vo by the resistors R8 and R9 and a reference voltage (not illustrated) and supplies a voltage after the amplification to the switching power supply control circuit 43.

The switching power supply control circuit 43 exercises on-off-control of the switching device Q2 on the basis of detection results at the terminals ZCD, FB, and CS. This produces a quasi-resonance action based on leakage inductance of the insulating transformer T1 and the capacitance of the capacitor C6. As a result, a determined output voltage Vo is generated.

A power factor in the above switching power supply apparatus 40 may be raised (may be made to approach one) by using the switching power supply control circuit 10 illustrated in FIG. 1 in the PFC step-up converter 41 of the switching power supply apparatus 40. As a result, harmonics are reduced.

The switching power supply control circuits 10 and 43 may be formed on two semiconductor chips as separate semiconductor devices or be formed together on a single semiconductor chip. Furthermore, if the switching power supply control circuits 10 and 43 are formed separately on two semiconductor chips, these two semiconductor chips may be housed in separate packages or be housed together in a single package.

In the above example, the switching power supply control circuit 10 is applied to the two-converter type switching power supply apparatus 40. However, another example is possible. The above switching power supply control circuit 10 may be applied to a one-package IC having the function of exercising PFC control and the function of controlling DC-DC conversion in order to realize the former function.

According to the disclosed switching power supply control circuit and switching power supply apparatus, the appearance of harmonics is prevented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply control circuit in a switching power supply apparatus including a first converter, including a switching device having terminals, that converts an input AC source voltage to a first DC voltage while performing power factor correction and a second converter that converts the first DC voltage to a second DC voltage, the switching power supply control circuit comprising:
   a comparison circuit that detects a bottom point of a voltage across the terminals of the switching device included in the first converter and provides an output signal indicating a detected bottom point;

a maximum frequency limitation circuit to provide an output corresponding to a maximum switching frequency for the switching circuit;
an AND circuit coupled to the maximum frequency limitation circuit and the comparison circuit to provide the output signal from the comparison circuit if a switching frequency of the switching circuit is not higher than the maximum switching frequency specified by the maximum frequency limitation circuit;
a delay circuit coupled to receive the output signal from the AND circuit and to output the output signal which is delayed;
an oscillation circuit coupled to receive the output signal from the delay circuit and to output an oscillating signal based on the output signal from the delay circuit;
a control signal generation circuit that generates a control signal for the switching device based on the oscillating signal output from the oscillation circuit and the output signal from the delay circuit, the control signal causing the switching device to turn on when the voltage across the terminals of the switching device corresponds to the bottom point, wherein
the control signal generation circuit includes a timer circuit and a flip-flop having a set terminal, a reset terminal, and an output terminal,
the oscillation circuit receives the output signal, raises a potential of a ramp signal based on receiving the output signal, returns the potential of the ramp signal at a reset timing of the flip-flop, and outputs the oscillating signal as the ramp signal,
the timer circuit activates the restart signal to raise the potential of the ramp signal when the set terminal of the flip-flop is not in an active state for outputting the control signal for turning on the switching element for a predetermined time,
when the output terminal of the flip-flop outputs the control signal for turning on the switching element, the timer circuit is reset, and
the oscillation circuit receives the restart signal, which is activated when the bottom point is not detected during a prescribed period of time corresponding to the predetermined time, and when the restart signal is activated, raises the potential of the ramp signal, regardless of the output signal of the delay circuit and the control signal output from the control signal generation circuit.

2. The switching power supply control circuit according to claim 1, wherein
the comparison circuit detects a time point at which a first voltage based on a current of an inductor included in the first converter falls below a second voltage produced by a constant voltage source and provides the output signal.

3. The switching power supply control circuit according to claim 1, wherein:
the first converter is implemented in a first semiconductor integrated circuit;
the second converter is implemented in a second semiconductor integrated circuit that is separate from the first semiconductor integrated circuit; and
the first semiconductor integrated circuit and the second semiconductor integrated circuit are mounted together in a single package.

4. A switching power supply apparatus comprising:
a first converter, including a switching device having terminals, that converts an input AC source voltage to a first DC voltage while performing power factor correction;
a second converter that converts the first DC voltage to a second DC voltage; and
a switching power supply control circuit comprising:
a comparison circuit that detects a bottom point of a voltage across the terminals of the switching device included in the first converter, and provides an output signal indicating a detected bottom point;
a maximum frequency limitation circuit to provide an output corresponding to a maximum switching frequency for the switching circuit;
an AND circuit coupled to the maximum frequency limitation circuit and the comparison circuit to provide the output signal from the comparison circuit if a switching frequency of the switching circuit is not higher than the maximum switching frequency specified by the maximum frequency limitation circuit;
a delay circuit coupled to receive the output signal from the AND circuit and to output the output signal which is delayed;
an oscillation circuit coupled to receive the output signal from the delay circuit and to output an oscillating signal based on the output signal from the delay circuit;
a control signal generation circuit that generates a control signal for the switching device based on the oscillating signal output from the oscillation circuit and the output signal from the delay circuit, the control signal causing the switching device to turn on when the voltage across the terminals of the switching device corresponds to the bottom point, wherein
the control signal generation circuit includes a timer circuit and a flip-flop having a set terminal, a reset terminal, and an output terminal,
the oscillation circuit receives the output signal, raises a potential of a ramp signal based on receiving the output signal, returns the potential of the ramp signal at a reset timing of the flip-flop, and outputs the oscillating signal as the ramp signal,
the timer circuit activates the restart signal to raise the potential of the ramp signal when the set terminal of the flip-flop is not in an active state for outputting the control signal for turning on the switching element for a predetermined time,
when the output terminal of the flip-flop outputs the control signal for turning on the switching element, the timer circuit is reset, and
the oscillation circuit receives the restart signal, which is activated when the bottom point is not detected during a prescribed period of time corresponding to the predetermined time, and when the restart signal is activated, raises the potential of the ramp signal, regardless of the output signal from the delay circuit and the control signal output from the control signal generation circuit.

5. The switching power supply apparatus of claim 4, wherein when the output signal of the delay circuit indicates detection of the bottom point, the switching device is always turned on.

6. The switching power supply apparatus of claim 4, wherein the switching device produces a voltage such that each time the voltage of the switching device falls to a bottom point, the switching device is turned on.

7. The switching power supply apparatus of claim 6, wherein the voltage of the switching device is a drain voltage.

8. A switching power supply control circuit for a switching power supply apparatus having an input current, the switching power supply apparatus including a converter, having a switching device having terminals, that converts an input AC source voltage to a first DC voltage while performing power factor correction, the switching power supply control circuit comprising:
- a comparison circuit that detects a bottom point of a voltage across the terminals of the switching device included in the converter and to provide an output signal indicating a detected bottom point;
- a maximum frequency limitation circuit to provide an output corresponding to a maximum switching frequency for the switching circuit;
- an AND circuit coupled to the maximum frequency limitation circuit and the comparison circuit to provide the output signal from the comparison circuit if a switching frequency of the switching circuit is not higher than the maximum switching frequency specified by the maximum frequency limitation circuit;
- a delay circuit coupled to receive the output signal from the AND circuit and to output the output signal which is delayed;
- an oscillation circuit coupled to receive the output signal from the delay circuit and to output an oscillating signal based on the output signal from the delay circuit;
- a control signal generation circuit that generates a control signal for the switching device based on the oscillating signal output from the oscillation circuit and the output signal from the delay circuit, the control signal causing the switching device to turn on when the voltage across the terminals of the switching device falls to the bottom point, so as to inhibit deviation of a waveform of the input current from a sine wave, wherein the control signal generation circuit includes a timer circuit and a flip-flop having a set terminal, a reset terminal, and an output terminal, the oscillation circuit receives the output signal, raises a potential of a ramp signal based on receiving the output signal, returns the potential of the ramp signal at a reset timing of the flip-flop, and outputs the oscillating signal as the ramp signal, the timer circuit activates a restart signal to raise the potential of the ramp signal when the set terminal of the flip-flop is not in an active state for outputting the control signal for turning on the switching element for a predetermined time, when the output terminal of the flip-flop outputs the control signal for turning on the switching element, the timer circuit is reset, and the oscillation circuit receives the restart signal, which is activated when the bottom point is not detected during a prescribed period of time corresponding to the predetermined time, and when the restart signal is activated, raises the potential of the ramp signal, regardless of the output signal of the delay circuit and the control signal output from the control signal generation circuit.

* * * * *